(12) United States Patent
Mall et al.

(10) Patent No.: US 11,196,687 B1
(45) Date of Patent: Dec. 7, 2021

(54) AUTOMATED, EXTENSIBLE NATURAL-LANGUAGE CONVERSATIONAL SYSTEM

(71) Applicant: Target Brands, Inc., Minneapolis, MN (US)

(72) Inventors: Prakash Mall, Karnataka (IN); Rajat Garg, Karnataka (IN); Natarajan Ramamurthy, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/709,200

(22) Filed: Dec. 10, 2019

Related U.S. Application Data

(60) Provisional application No. 62/777,485, filed on Dec. 10, 2018.

(51) Int. Cl.
*H04L 12/58* (2006.01)
*G06F 40/20* (2020.01)
*G06Q 30/06* (2012.01)

(52) U.S. Cl.
CPC .............. *H04L 51/02* (2013.01); *G06F 40/20* (2020.01); *G06Q 30/0603* (2013.01)

(58) Field of Classification Search
CPC ...... H04L 51/02; G06F 40/20; G06Q 30/0603
See application file for complete search history.

(56) References Cited

U.S. PATENT DOCUMENTS

| | | | |
|---|---|---|---|
| 7,505,892 B2 | 3/2009 | Foderaro | |
| 7,603,413 B1 | 10/2009 | Herold et al. | |
| 7,783,486 B2 | 8/2010 | Rosser et al. | |
| 8,630,961 B2 | 1/2014 | Beilby et al. | |
| 8,949,377 B2 | 2/2015 | Makar et al. | |
| 9,300,790 B2 | 3/2016 | Gainsboro et al. | |
| 9,369,410 B2 | 6/2016 | Capper et al. | |
| 9,704,175 B2 | 7/2017 | Moeinifar et al. | |
| 9,713,774 B2 | 7/2017 | Hoomani et al. | |
| 9,912,810 B2* | 3/2018 | Segre | H04M 3/5166 |
| 2003/0220972 A1 | 11/2003 | Montet et al. | |
| 2008/0189367 A1 | 8/2008 | Okumura | |
| 2014/0122619 A1 | 5/2014 | Duan | |
| 2014/0279050 A1 | 9/2014 | Makar et al. | |

OTHER PUBLICATIONS

Anderson, Duncan, Multi-Channel Chat Bots—Duncan Anderson Medium, https://medium.com/@duncsand/multi-channel-chat-bots-1040afd848d8, Date: Dec. 3, 2017; 7 Pages.

Features—Chirrp, About the Chirrp Experience—Engage in Rich Conversation, https://www.chirrp.ai/features/, Date: Dec. 3, 2017; 6 Pages.

SnatchBot—Chatbox Channels—SnatchBot's omni-channel platform, A Bot Builder Platform for Businesses, https://snatchbot.me/channels, Date: Dec. 3, 2017; 5 Pages.

\* cited by examiner

*Primary Examiner* — El Hadji M Sall
(74) *Attorney, Agent, or Firm* — Merchant & Gould P.C.

(57) ABSTRACT

An automated chat conversation platform and method of operation are described. The automated chat conversation platform includes extensible chat interfaces useable for chat session communication with a plurality of third party communication tools, and is designed to be automatically scalable according to a number of chat sessions in existence concurrently. The automated chat conversation platform identifies chat sessions in which user intervention may be important, and allows for selective intervention by user agents.

13 Claims, 16 Drawing Sheets

AUTOMATED, EXTENSIBLE NATURAL-LANGUAGE CONVERSATIONAL SYSTEM

CROSS-REFERENCE TO RELATED APPLICATIONS

The present application claims priority from U.S. Provisional Patent Application No. 62/777,485, filed on Dec. 10, 2018, the disclosure of which is hereby incorporated by reference in its entirety.

BACKGROUND

Automated natural language conversation systems, such as automated chat systems (e.g., chat-bots) exist which allow a user to submit messages in the form of questions or statements. An automated chat-bot will in turn parse the language included in the question and attempt to present a responsive reply message.

However, such chat-bots have drawbacks. For example, typically, a chat-bot may be integrated into a website or mobile application, and is configured to submit the messages received from a user to a chat Application Programming Interface (API), and thereby receive in response a reply message from the API. The API can be exposed from a monolith software that manages chat sessions with a plurality of different websites or applications. The chat service supporting the API may be an individual instance that draws from a common set of knowledge and services, which ensures that the knowledge store available to the chat service is up to date, but limits the number of chat sessions that can be supported by the service. Still further, even chat services that are designed to support an API are often configured to support a specific user interface type (e.g., web or mobile device) and are not extensible to additional types of communication services that may support chat communications. Still further, at high volume of concurrent chat sessions, it can be difficult to maintain high quality of chat sessions. This is because it can be difficult for a single user chat agent to track and monitor a large number of sessions. To address this concern, in some cases an automated chat session may begin to collect preliminary data (e.g., name, concern, account number, etc.) and then, as a matter of course, pass the chat session to a user agent. This is similarly inefficient, because a user agent would be required to perform at least a portion of each chat session.

SUMMARY

In general, an automated chat conversation platform and method of operation are described. The automated chat conversation platform includes extensible chat interfaces useable for chat session communication with a plurality of third party communication tools, and is designed to be automatically scalable according to a number of chat sessions in existence concurrently. The automated chat conversation platform identifies chat sessions in which user intervention may be important, and allows for selective intervention by user agents.

In a first aspect, an automated chat conversation platform includes a chat gateway communicatively connected to a plurality of chat channel interfaces, each of the chat channel interfaces being configured to exchange messages with chat users via a different chat platform type. The platform further includes a chat server communicatively connected with the chat gateway, the chat server programmed to manage a plurality of chat sessions each including one or more natural language messages, the plurality of chat sessions being initiated from one or more of the plurality of chat channel interfaces via the gateway. The platform also includes a collection of chatbots each configured to receive the natural language messages associated with a chat session from the chat server. A number of chatbots included in the collection of chatbots available to receive natural language messages is scalable in real time responsive to a volume of active chat sessions at the chat server.

In a second aspect, a method of operating an automated chat conversation platform is disclosed. The method includes receiving messages at a chat gateway from a plurality of chat channel interfaces, the plurality of chat channel interfaces being configured to exchange messages with chat users via a different chat platform type. The method also includes providing the messages to a chat server, the chat server programmed to manage a plurality of chat sessions each including one or more natural language messages, as well as assigning a chatbot to each chat session represented by the messages. The method includes presenting a chat monitoring interface to a user agent, the chat monitoring interface displaying information regarding a plurality of different selectable chat sessions occurring in realtime, and upon receiving selection of a chat session from among the plurality of different selectable chat sessions, interrupting operation of a chatbot associated with the chat session and generating a user agent chat interface.

In a third aspect, an automated chat conversation platform includes a chat server programmed to manage a plurality of chat sessions each including one or more natural language messages, the plurality of chat sessions being initiated from one or more of a plurality of chat channel interfaces. The platform includes a collection of chatbots each configured to receive the natural language messages associated with a chat session from the chat server, wherein a number of chatbots included in the collection of chatbots available to receive natural language messages is scalable in real time responsive to a volume of active chat sessions at the chat server. The platform also includes a natural language processing service exposed to each of the chatbots included in the collection of chatbots and useable to process the natural language messages, and an enterprise service exposed to each of the chatbots, the enterprise service providing content for use in reply messages from the chatbots. The platform further includes an interface-specific proxy layer positioned between a chat user and a user agent, the interface-specific proxy layer converting reply messages between the chatbots or user agents and the chat user according to a chat channel selected by the chat user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

As briefly described above, embodiments of the present invention are directed to an automated chat conversation platform. The automated chat conversation platform includes extensible chat interfaces useable for chat session communication with a plurality of third party communication tools, and is designed to be automatically scalable according to a number of chat sessions in existence concurrently. The automated chat conversation platform identifies chat sessions in which user intervention may be important, and allows for selective intervention by user agents.

The chat platform described herein provides real-time, interactive chat sessions, e.g., in either voice or text format. The platform is capable of seamlessly (1) initiating chat sessions sourced from chat initiating users a variety of types of systems (mobile, web, social media, slack, etc.), and providing automated chat responses to such known messages. Chatbots are able to be supervised by responding users and can seamlessly hand over conversations to the responding users at a time where the chatbots cannot adequately respond to queries/statements of the chat initiating users. This allows a user agent to view existing chat sessions and intervene in specific chat sessions on an as-needed basis.

The chat system described herein has a number of possible applications. For example, within a large organization, and in particular a large retail organization having both employees and customers, the chat system may be useable for information retrieval using artificial intelligence and natural language processing. The chat system is particularly well-designed for use in situations where solutions to requests are well known and predictable, and there is a high volume of requests. Requests can include, for example, knowledge based articles; store timing/location, item price or inventory availability, human resources policies, return policies, item support issues, or various other types of situations where answers are knowable.

The chatbots used in this innovation perform conversation control and management, natural language processing, and some business-specific work (e.g., when to mark a particular issue as being resolved, such as for an inquiry question). In addition, within each chat bot, messages can be received, and categorized as being part of a new or existing message thread, e.g., a chat session. Context is generated as needed, and run to generate a response that is appropriate given the circumstances of that individualized chat session. Based on the natural language processing, each chatbot can notify a user agent of a possible need for intervention.

A monitoring interface presents to a supervising user a number of active users (chats), a waiting queue of users waiting to chat, and various metrics regarding a number of chats initiated, types of questions asked/answered, and time duration for each thread/session.

Figure 1:
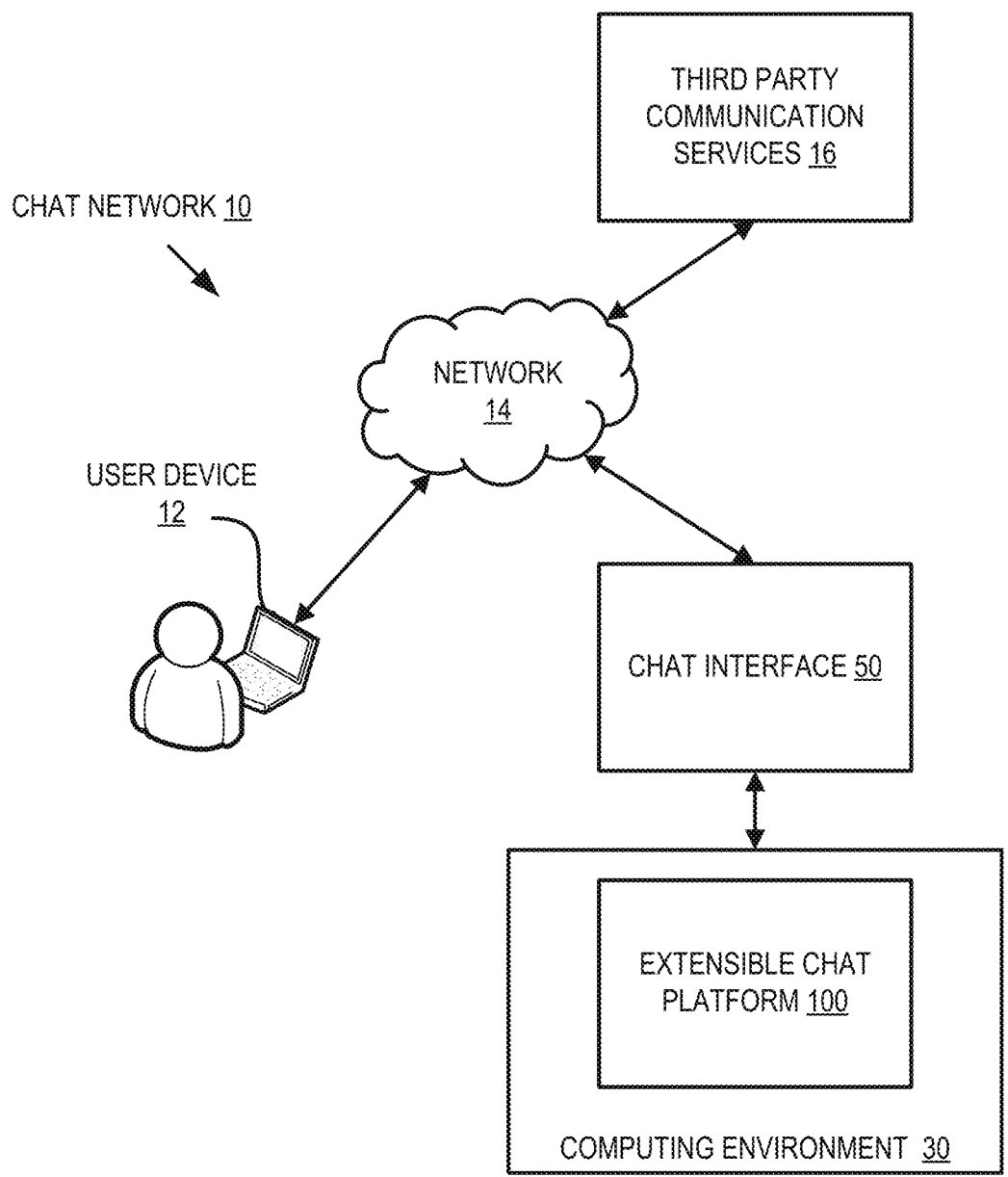
FIG. 1 illustrates a chat network in which aspects of the present disclosure can be implemented.

Referring now to FIG. 1, a chat network 10 is shown in which aspects of the present disclosure can be implemented. The chat network 10 includes a user device 12 connected to a chat interface service 50 via a network, as well as third party communication services. The chat interface service 50 can be communicatively coupled to a computing environment 30 hosting an extensible chat platform 100.

The user device 12 can be any type of mobile or desktop computing device capable of communication with a remote system, e.g., via a browser window, mobile application, instant messaging service, or social media utility. The third party communication services 16 can take any of a number of forms, including, for example, corresponding to platforms on which messages can be exchanged between parties. Example third party communication services can include, for example, social media sites, web-hosted email sites, Slack, HipChat, or other web-based or server-based communication tools.

The chat interface service 50 acts as an agent of the chat platform 100, to exchange messages either directly with the user device 12 or with a user device via a third party communication service 16. As outlined below, the chat interface service 50 is extensible and includes a plurality of chat interfaces, each of which is capable of communicating chat messages using a different channel. The chat platform 100 receives messages via the chat interface service 50 and assigns a chatbot to handle messages associated with a particular chat session. The chat platform 100 processes natural language chat messages and generates natural language responses for distribution to the user via the respective chat interface.

Figure 2:
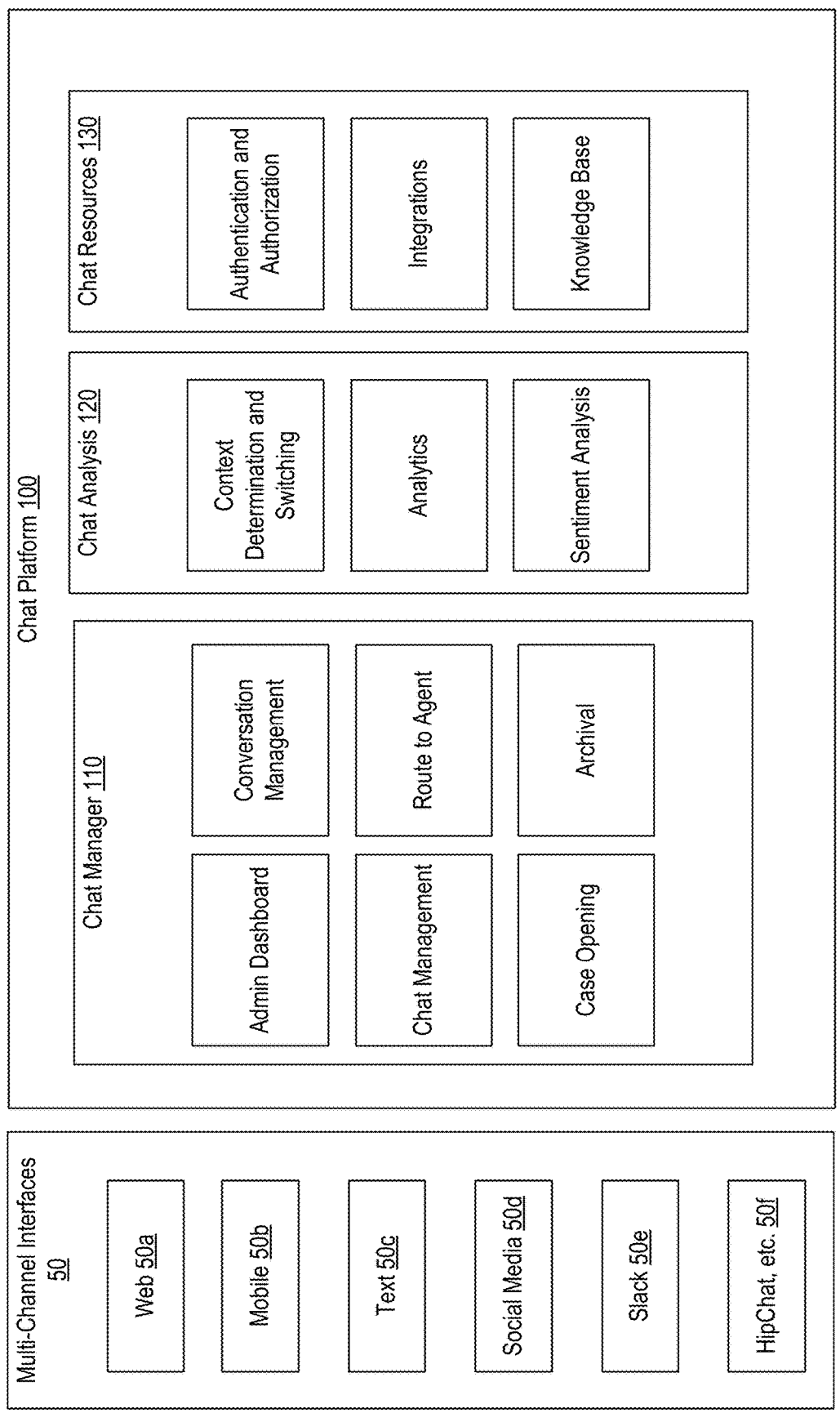
FIG. 2 is a functional block diagram of a chat system including an automated chat conversation platform, according to an example embodiment of the present disclosure.

Additional details regarding one example embodiment of the chat platform 100 are provided in FIG. 2, which illustrates functional block diagram of a chat system 200 including a chat platform 100 and chat interface service 50.

In the example shown, the chat interface service 50 includes a plurality of chat interfaces 50a-f. Each of the chat interfaces is configured to manage communication of chat messages according to a different channel. In the example shown, a web interface 50*a*, a mobile application interface 50*b*, a text client interface 50*c*, a social media interface 50*d*, a Slack interface 50*e*, and a HipChat interface 50*f* are displayed; however, in other embodiments, more or fewer such interfaces could be included. In addition, because the chat interface service 50 is modular and extensible, more interfaces can be added to the service 50 as different communication channels rise or fall in popularity of use.

Each of the interfaces 50*a-f* is generally configured to expose the chat platform as a contact, or user, to a potential user wishing to initiate a chat session according to one of the channels. For example, in the case the chat platform is associated with a retail enterprise, the interfaces 50*a-f* can be associated with an online entity representation of the retail enterprise, which may allow users (both employees and customers) to ask questions of the retail enterprise as may be needed. Such questions could be, for example, store hours, where to find a particular product, store policies (e.g., return policies), prices, shipping times, locations, etc.

The chat platform 100 is also scalable and modular in design. In the embodiment shown, a chat manager 110, a chat analysis module 120, and a chat resources module 130 include sub-modules that provide platform functionality, but are each extensible as needed.

The chat manager 110 includes an administrative dashboard 111, a conversation management module 112, a chat management module 113, an agent routing module 114, a case opening module 115, and an archival module 116. The administrative dashboard 111 tracks statistics regarding all chat sessions that are currently in operation or which have terminated. The administrative dashboard 111 can be presented in an administrative user interface, such as user interface 900 of FIG. 9, described below. The conversation management module 112 manages chat sessions with users by tracking whether a message is associated with a new or existing conversation, and either assigning a new chatbot to that message (in the event the message is a first message in a chat session or conversation) or routing the message to an appropriate chatbot for handling. A chat management module 113 tracks correspondence between chat sessions and chatbots, and monitors whether the chat session has timed out. An agent routing module 114 manages instances where an agent may intervene, such that messages are routed to the agent rather than to an automated natural language processing and response system by the chatbot. As noted below, the agent routing module 114 will continue to track the chat session status even after routing to a user agent; the user agent may complete his/her intervention, and return control to the chatbot. In such instances, the agent routing module 114 will reroute messages to the chatbot rather than the user agent.

In the embodiment shown, a case opening module 115 will open a ticket in the event the chatbot or user agent is incapable of resolving an issue that was a reason for the chat session. The archival module 116 may store the chat session, either for later analysis and improvement of the chat platform 100, or for use by enterprise personnel wishing to follow up on a particular issue for which a case was opened by the case opening module 115, e.g., outside of a chat session.

The chat analysis module 120 generally is used by chatbots to determine a meaning in natural language messages received at the system 100. Generally, the chat analysis module cam be implemented by deconstructing and tokenizing the natural language expression included in a message, for purposes of determining, e.g., the user's context, intended sentiment. The chat analysis module 120 includes a context determination module 121, an analytics module 122, and a sentiment analysis module 123. The context determination module 121 determines context of the message by assessing the circumstances in which it is received (e.g., the channel of receipt, whether the speaker is known, and the structure of the natural language phrase itself. The analytics module 122 can compare the natural language message to existing messages/analyzed previous messages to determine its relationship to other types of messages that have been replied to in the past. The sentiment analysis module 123 can determine, based on the phrase or language used in the natural language message, whether a positive or negative sentiment is expressed. The sentiment analysis module 123 can then recommend, in some instances, whether user intervention by a user agent may be advisable.

The chat resources module 130 includes an authentication and authorization module 131, an integrations module 132, and a knowledge base 133. The authentication and authorization module 131 manages authentication of users of the chat system, including user agents, administrators, and optionally chat users. The integrations module 132 provides integration of the chat system with other enterprise systems that may contain information that is useful in responding to chat messages. For example, the integrations may include integrations with other enterprise systems, such as an inventory system to indicate location of products, or external systems, such as public knowledge sources. The knowledge base 133 corresponds to background knowledge that can be provided in the context of replies to messages. The knowledge base may include, for a particular enterprise, information about the enterprise that may be helpful in forming a reply, such as locations, hours, etc. of retail locations, policies of the enterprise, or other general knowledge that may be of use. It is noted that the chat resources module 130 can also include various other types of resources, and is also extensible to allow for different information to be available to chatbots for reply to messages.

Figure 3:
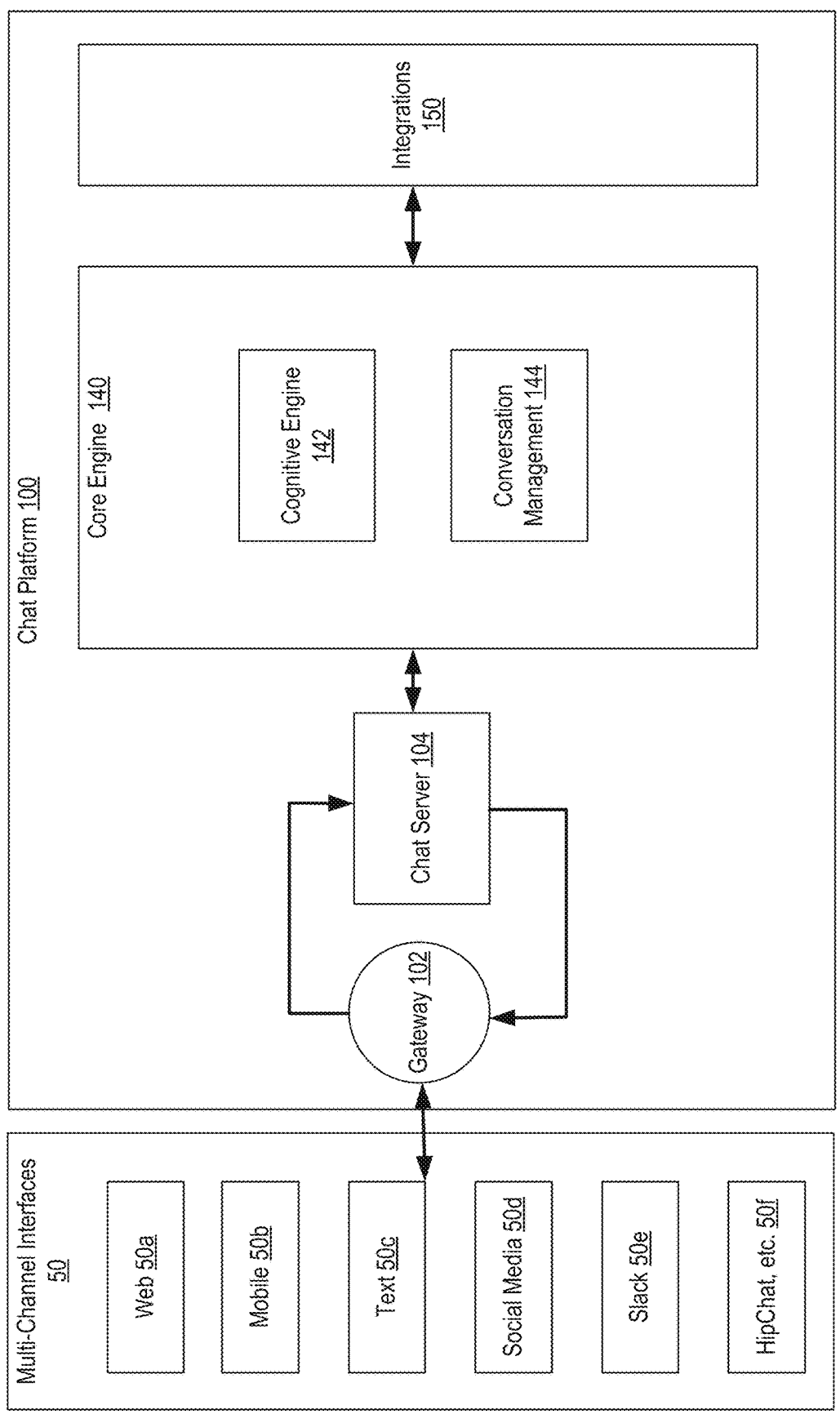
FIG. 3 is an architecture diagram of the chat system of FIG. 2, according to an example embodiment of the present disclosure.

FIG. 3 is an architecture diagram 300 of the chat system of FIG. 2, according to an example embodiment of the present disclosure. The architecture diagram illustrates components that can be used to implement the chat system as described above.

In the embodiment shown, the architecture diagram 300 illustrates that the chat platform 100 includes a gateway 102 that is communicatively connected to the interfaces 50, and exchanges messages with the interfaces. The gateway 102 acts as a central router for messages to ensure messages are received from and transmitted to the correct interfaces, and therefore the correct channels for communication with a user.

The gateway 102 is communicatively connected to a chat server 104, which hosts and manages various chatbots that may be instantiated within the platform 100. The chat server 104 can be implemented using any of a plurality of chat server services, such as Rocket.Chat or other open source systems. However, in the present implementation, the chat server 104 is configured to ensure scalability across each of the possible interfaces 50 that may be used as well as a high volume of chat sessions, by allowing the chat server 104 to support a large number of chatbots, while providing access to chatbot support services external to the chat server 104. In the example shown the chat server 104 can be implemented to spawn a new chatbot per chat session; in alternative embodiments, other ways of managing chatbots can be implemented. Details regarding functional interconnections of chatbots and message handling by each chatbot are provided below.

In the embodiment shown, the chat server 104 is communicatively connected to a core engine 140. The core engine 140 manages processing of natural language messages, as well as compilation of reply messages. For example, the core engine 140 may include natural language processing engines, chat analysis tools, and other capabilities for formulating replies to messages. The core engine 140 is further communicatively connected to integrations 150 (as discussed above), to allow the core engine to acquire information that may be required to formulate such a reply.

In the example shown, the core engine 140 includes a cognitive engine 142 and a conversation management module 144. The cognitive engine 142 uses pattern recognition and machine learning to process natural language messages and determine context for such messages in order to provide responses. In example embodiments, the cognitive engine 142 can be trained using an existing set of queries against which user responses are provided. In some example embodiments, the cognitive engine 142 may process natural language messages based on a process as outlined below in conjunction with FIG. 10. The conversation management module 144 provides dialogue management, for example to preserve context among multiple messages and responses received during a chat session. The conversation management module 144 can, for example, track topics discussed across messages and assist in formulating natural language responses to messages.

In example embodiments, the functional blocks described above in conjunction with FIG. 2 can be implemented within, e.g., a chat server 104, core engine 140, or integrations 150 described above.

Figure 4:
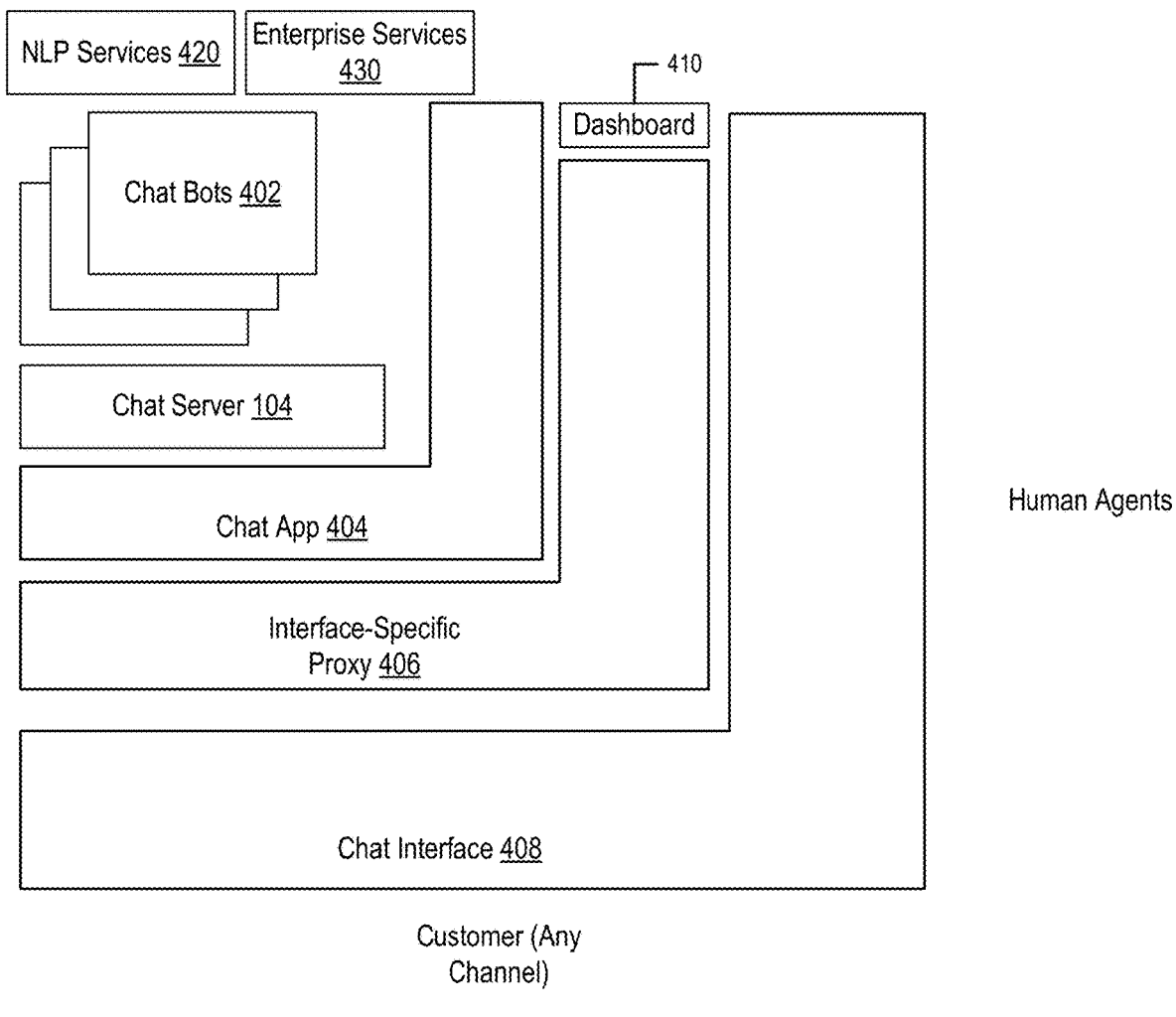
FIG. 4 is a diagram of a logical software stack useable to implement the chat system of FIG. 2, according to an example embodiment of the present disclosure.

FIG. 4 is a diagram of a logical software stack 400 useable to implement the chat system of FIG. 2, according to an example embodiment of the present disclosure. The software stack 400 provides an interface between chat users and human chat agents and/or chatbots, to provide scalable chatbot capabilities for communication with chat users and selective intervention by human chat agents. In the example shown, a plurality of chatbots 402 are hosted by chat server 104. The chatbots 402 can be instantiated by the chat server 104 on a per-chat session basis, or other frequency. A chat application 404 can be constructed as a collection of services that act as a proxy to the chat server for various interactions, defining information about chat sessions currently underway, as well as users participating in such sessions; the chat application provides an application front-end that can be integrated into various chat interfaces 408 (e.g., in interfaces 50 as described above). The chat application 404 can take the form of a Java widget that can be incorporated into a third party website, with interface-specific proxy 406 reconfiguring the chat messages (e.g., passed in JSON format) for exchange with an application based on the channel selected by the chat user. A chat interface 408 is provided to the chat users and user agents, e.g., unique to the selected interface to the chat application that each user selects.

In the embodiment shown, each of the chatbots 402 can be implemented using node.js, and a chat widget can be incorporated into any selected interface using a JavaScript addition to that particular webpage or application. The chatbots 402 are interfaced to natural language processing services 420 and enterprise services 430. The natural language processing services 420 resolves context for each received message, while the enterprise services 430 obtains relevant context based on the message received. In particular, the natural language processing performs classification of a received message, as well as named entity recognition to determine if any business-specific terms are used. Additionally, sentiment analysis is performed, to determine if the message is positive or negative. A response can then be generated based on this analysis. In an example implementation, the natural language processing code can be implemented using the Python programming language.

Each chatbot 402 can be instantiated in a custom manner based, e.g., on the source of a message (i.e., on a user-specific or audience-specific basis). For example, a chatbot configured for use by a customer may have a different manner of formulating reply messages to a chatbot configured for use in answering employee queries. For example, questions about whether a particular item is out of stock may result in a different answer to a customer (e.g., recommending alternative methods of obtaining an item) than to an employee (e.g., recommending action to be taken). Additionally, over time, chatbots may improve in terms of reactions to specific audiences, e.g., the accuracy of response to messages. This can be accomplished by analyzing chat histories using any of a variety of artificial intelligence systems (e.g., using one or more types of neural networks trained on datasets, to provide specialized neural networks responsive to user requests depending on context). The resulting chatbots that are instantiated for responding in specific context may be selected to have different response "personalities" depending on the perceived context, sentiment (positive or negative), or business context in which a chat session is instantiated.

Figure 5:
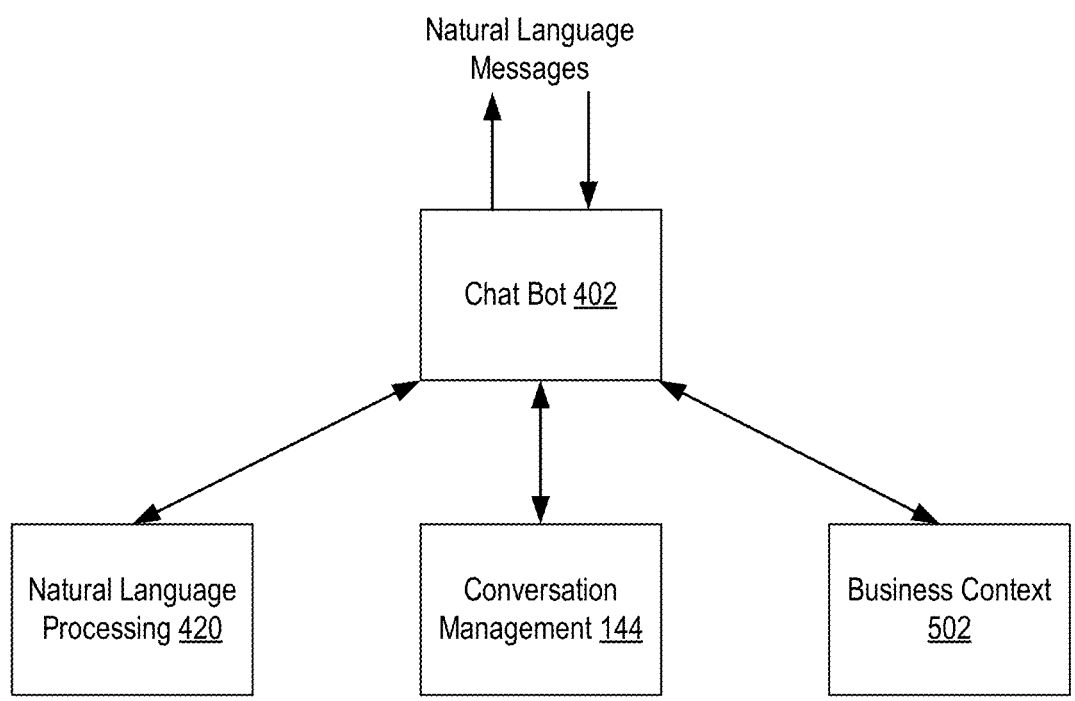
FIG. 5 is a block diagram illustrating interactions of a chatbot within the chat system of FIG. 2, according to an example embodiment of the present disclosure.

FIG. 5 is a block diagram illustrating interactions of a chatbot 402 within the chat system of FIG. 2, according to an example embodiment of the present disclosure. In the example shown, the chatbot 402 exchanges natural language messages with users, e.g., via an interface corresponding to the selected client of the user. As noted above, each chatbot 402 is interface-agnostic, in that it can be used to communicate with any type of client system via interface adapters 50*a*-*f*. The chatbot 402 accesses natural language processing services 420 as noted above, and is tracked/managed by a conversation management module 144. Additionally, the chatbot 402 accesses business context from a business context engine 502 for purposes of formulating proper responses.

Figure 6:
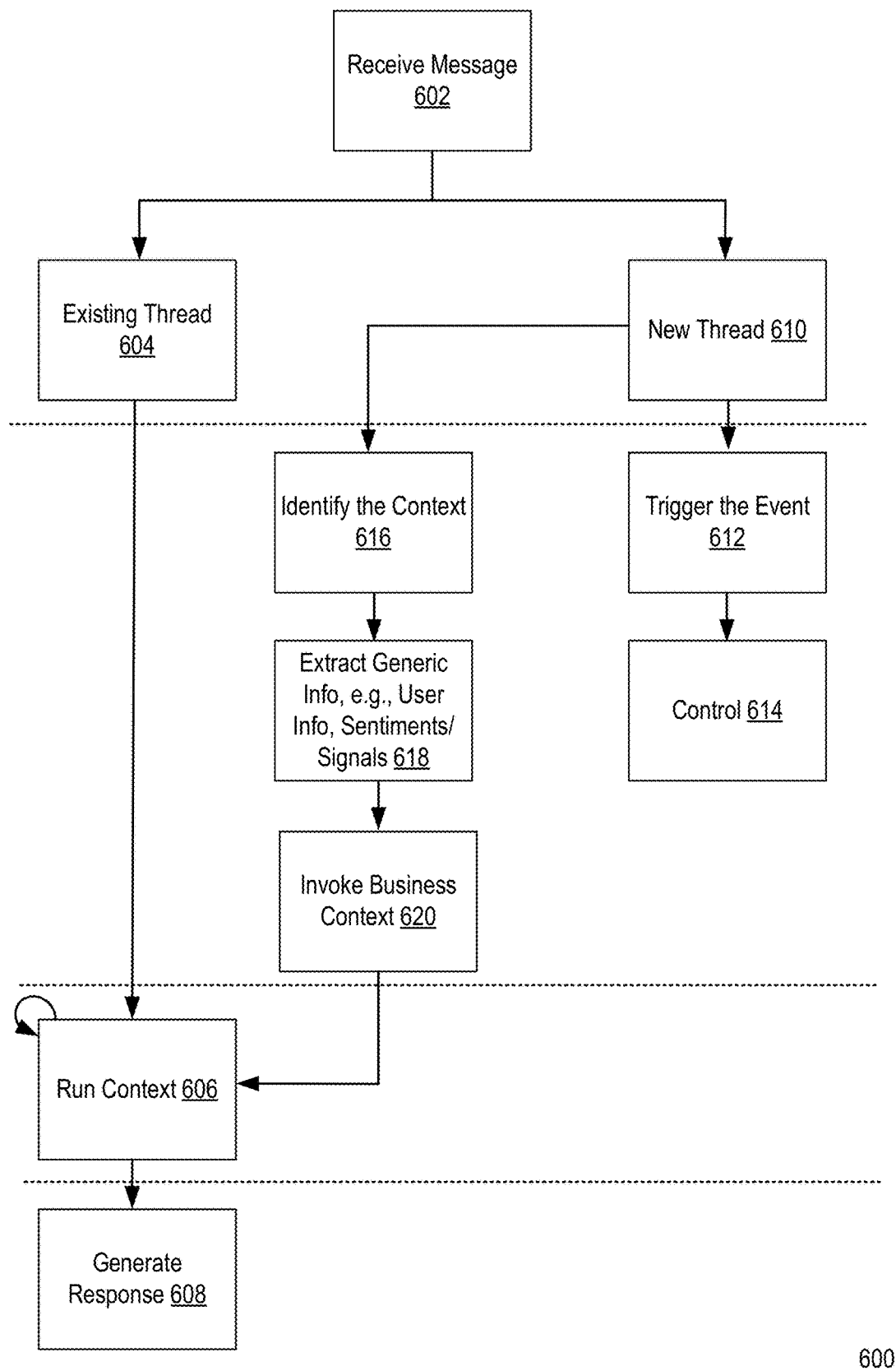
FIG. 6 is a flowchart illustrating message handling within the chat system of FIG. 2, according to an example embodiment of the present disclosure.

FIG. 6 is a flowchart illustrating a method 600 of message handling within the chat system of FIG. 2, according to an example embodiment of the present disclosure. Generally, the method includes, at 602, receiving a message at the chat server. The chat server can determine, for example, if the message is part of an existing message thresh or a new thread. If the chat server determines at 604 that the message is part of an existing thread, at 606, a context determination is performed. The context determination includes processing the natural language message to generate a response at 608, using a chatbot previously associated with the message thread. It is noted that because the message is part of an existing thread, business context and user-specific context has already been determined for that message thread (e.g., determining whether the chat user is a customer or employee, determining a topic of conversation and relevant business context).

If the chat server determines that the message is not part of an existing thread at 610, an event is triggered at 612 and a context generation process occurs in parallel. The triggered event 612 causes control of the message to be passed to a new chatbot at 614, which will manage response to messages associated with the chat thread/session. At 616, context for the chat session is determined, such as the time of the message, source of the message, user seeking information, and any other associated context that may be applicable. At 618, generic information is extracted from the message, including user information and any signals or sentiments (generally, whether the message is positive, negative, neutral, etc.). At 620, a business context is determined to provide insight into the specific perspective from which the message is received, which can assist in formulating a response. The context, sentiment, and business context information can then be used to run context at 606, to generate a message response.

Figure 7:
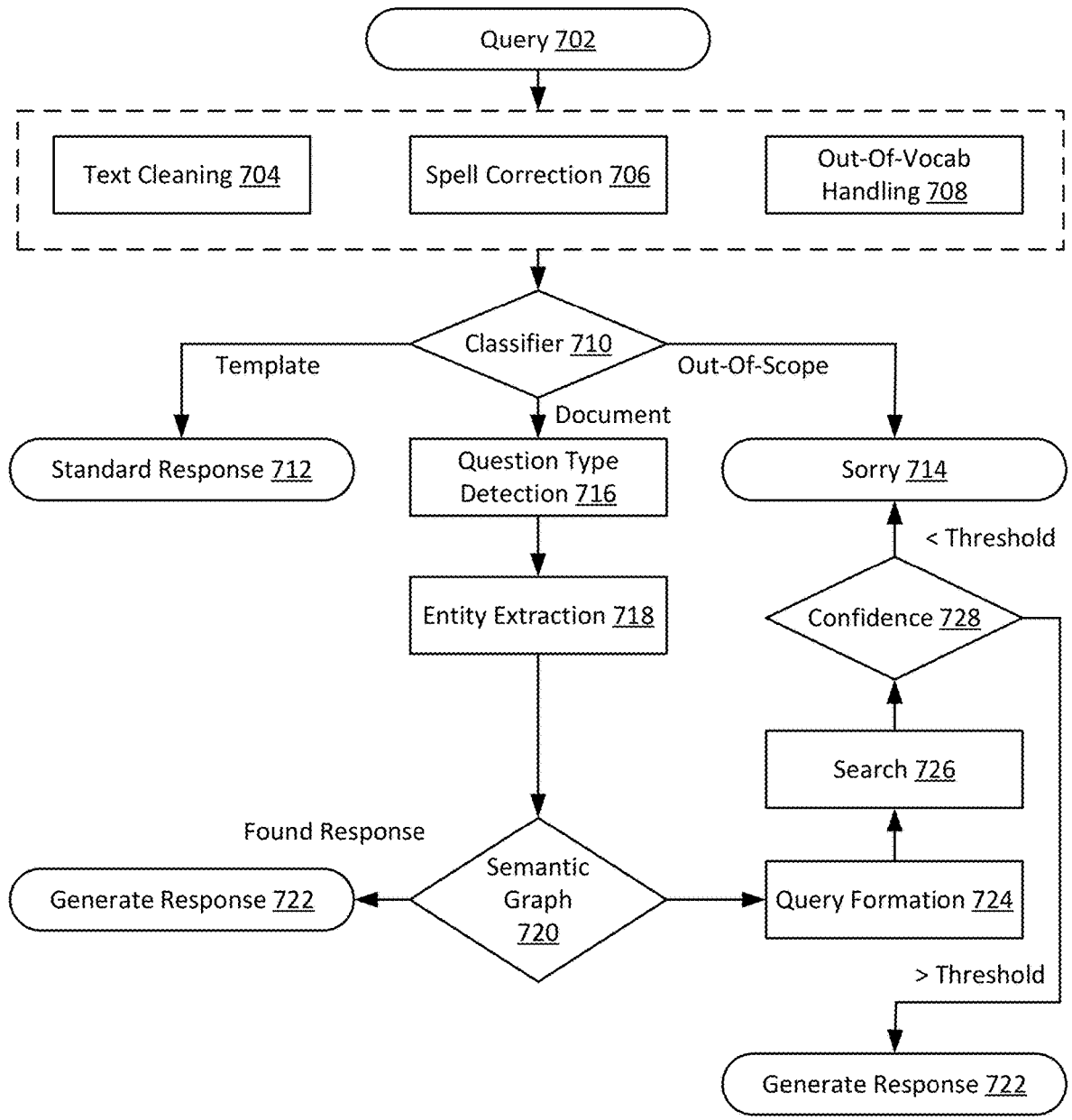
FIG. 7 is a flowchart illustrating query handling via a natural language processing architecture useable by the automated chat conversation platform of the present disclosure, according to an example embodiment.

FIG. 7 is a flowchart of a method 700 of query handling via a natural language processing architecture useable by the automated chat conversation platform described herein. As illustrated the method 700 is instantiated by receiving a natural language query, at 702. The query can be received from any of a variety of channels within the chat architecture described above.

The natural language query 702 is passed to a processing unit which includes a text cleaning module 704, a spell correction module 706, and an out-of-vocabulary handling module 708. The text cleaning module 704 will parse the natural language query, and extract words from the received query. This can include, for example, removal of noisy characters, non-ASCII characters, stopwords, etc. The spell correction module 706 will, based on context, correct the spelling of one or more words determined to be misspelled within the natural language query. The out-of-vocabulary handling module 708 will process one or more additional routines based on a word not being included within a vocabulary of the platform. The out-of-vocabulary handling module 708 may, for example, request that a user provide an alternative word, or may ignore the word entirely. Other options are possible as well.

In the embodiment shown, the processed query is passed to a classifier 710. The classifier 710 will determine whether the query implicates a template, a document, or is out of scope of the platform. If the classifier 710 determines that the query implicates a template, a standard response 712 is generated. If the classifier 710 determines that the query is out of scope, an error message 714 is displayed to the user. However, if the classifier 710 determines that the query implicates a document, at 716, a question type is detected. The question type can be classified based on a category of the information requested in the query. For example, the question type maybe about operating hours of a retail location, available inventory for a particular product, benefits availability, applicability of a promotion, etc.

In the embodiment shown, the method 700 includes, at 718, an entity extraction operation. The entity extraction operation determines a relevant entity associated with the query (e.g., a particular store, a particular product, etc.) A semantic graphing operation 720 will use the relevant entity and question type to generate a response at 722. However, if the semantic graph cannot identify a response within a semantic graph, a query formation operation 724 may be used to reformulate a query based on the text received in the original query 702. A search operation 726 can be performed based on the query that is formed, and results passed to a confidence assessment operation 728. If no results exceed a predetermined confidence threshold, an error message 714 is displayed to the user. However, if a result of the search exceeds a confidence threshold, a response is generated at 722.

Referring now to FIGS. 8-16, a variety of user interfaces are shown illustrating execution of chat services, as well as monitoring of chat sessions by a human chat agent. As noted above, specific chat sessions may be provided within the context of a retail website. However, the automated chat system described herein may be applied in a variety of contexts. For example, in addition to use on a retail website, the automated check system may allow for chat sessions within an application, social media platforms, or a variety of other electronic communication means. In addition, the automated check system can, on a user-by-user basis, customize chat services to the responses within the context that the chat session is initiated. For example, a retail customer and an employee at a retail location may ask a similar questions, but may provide a different sets of information or different options for response given the context of those users (e.g., the platform on which the user initiates the chat session, the identity of the user, etc.).

Figure 8:
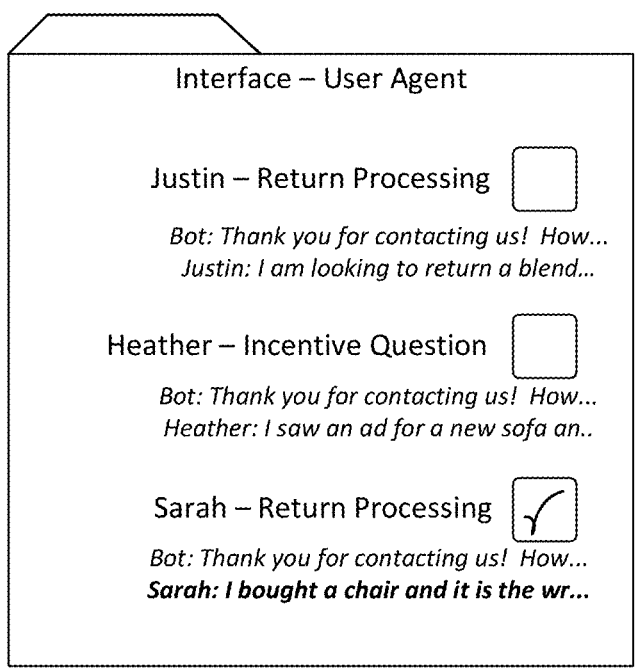
FIG. 8 is an example agent user interface useable by a human chat agent to monitor a plurality of chatbots in realtime, according to an example embodiment.

FIG. 8 is an example agent user interface 800 useable by a human chat agent to monitor a plurality of chatbots in realtime, according to an example embodiment. The agent user interface 800 displays a plurality of chat sessions that can be monitored by a user agent. The chat sessions can optionally be user-selectable to allow the user agent to intervene in particular chat sessions. As illustrated in FIG. 8, a portion of each chat session can optionally be displayed to allow the human agent to view at least a most-recent portion of the chat messages and/or responses.

In the example shown, one or more chat sessions can be designated automatically by the chat system described herein as likely requiring attention of a human user agent. This can be performed in a number of ways. For example, if a message is received from which aa confidence in accuracy of response is low, the message may be highlighted in the user interface (e.g., by presenting the message in bold as shown, or otherwise color-coding the chat sessions or ordering chat sessions in order of decreasing likelihood of requiring intervention) to allow a human user agent to select the chat session for intervention.

Although the agent user interface 800 includes three chat sessions displayed, it is noted that this is for simplicity of depiction only. Typically, the agent user interface can be configured to display all or a subset of active chat sessions. In some embodiments, the agent user interface 800 highlights specific chat sessions or messages that may require user agent intervention (e.g., as shown in bold in FIG. 8). Such chat sessions may include chat sessions for which sentiment analysis indicates that a user is expressing negative sentiments in his/her communications repeatedly, and therefore human chat agent interaction may be advisable. In still other embodiments, the only chat sessions that are displayed in the agent user interface 800 are those which were automatically determined to potentially require user agent intervention. In the embodiment shown, each of the chat sessions is selectable, allowing a user agent viewing the agent user interface 800 to intervene in a chat session.

Figure 9:
FIG. 9 is an example chat interface useable by the human chat agent to interrupt operation of a chatbot in realtime.

FIG. 9 is an example chat interface 900 useable by the human chat agent to interrupt operation of a chatbot in realtime. The chat interface 900 can be reached, for example, by a human chat agent viewing the agent user interface 800 and selecting a particular chat session in which to intervene. When a user agent intervenes, the chat session is handled by the chat server 104 to interrupt activity of a chatbot, and pass control of generating reply messages to the user. The chat interface 900 includes a chat display region and chat response box in which the human chat agent, or user agent, can respond to user messages. Additionally, an "exit conversation" option 902 allows the user agent to exit the chat session, which causes the chat server 104 to pass control of generating responses back to the automated chatbot, and optionally also returns the user display to the agent user interface 800 of FIG. 8.

Figure 10:
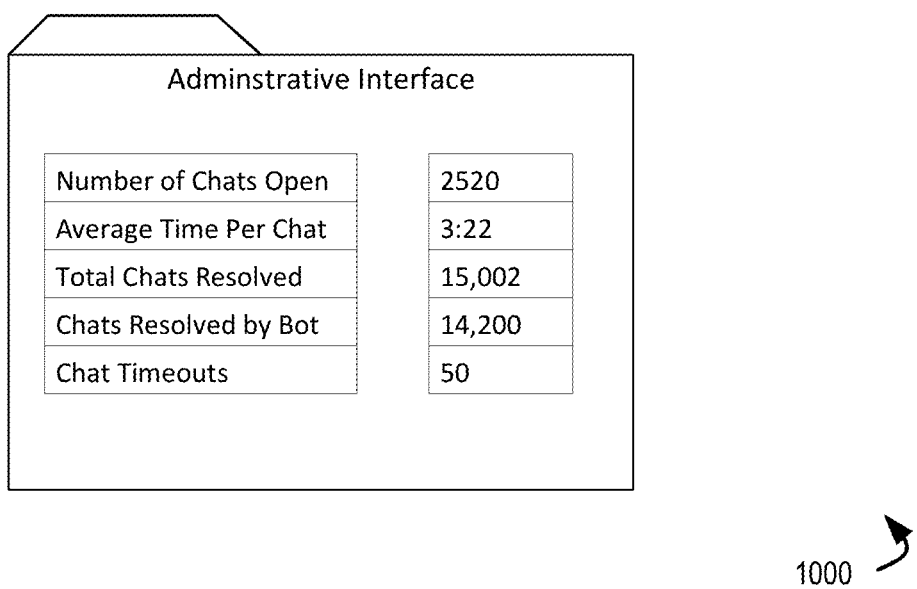
FIG. 10 is an example of an administrative user interface useable to monitor statistics regarding the chat system of FIG. 2.

FIG. 10 is an example of an administrative user interface 1000 useable to monitor statistics regarding the chat system of FIG. 2. The administrative user interface 1000 presents a dashboard to an administrative user showing realtime or near-realtime statistics regarding operation of the chat system. These can include, for example, number of chat sessions currently open, average time per chat session, total chat sessions resolved, chat sessions resolved entirely by automated chatbot, and chat timeouts. Other types of statistics could also be tracked and displayed to an administrative user as well.

Referring now to FIGS. 11-16, an additional set of user interfaces is shown illustrating a sequence of interactions between a user and the automated chat system described herein. In particular, the user interfaces illustrate use within a retail setting, such as to provide support services with respect to item inquiries. However, it is recognized that the automated check system may provide additional support services.

Figure 11:
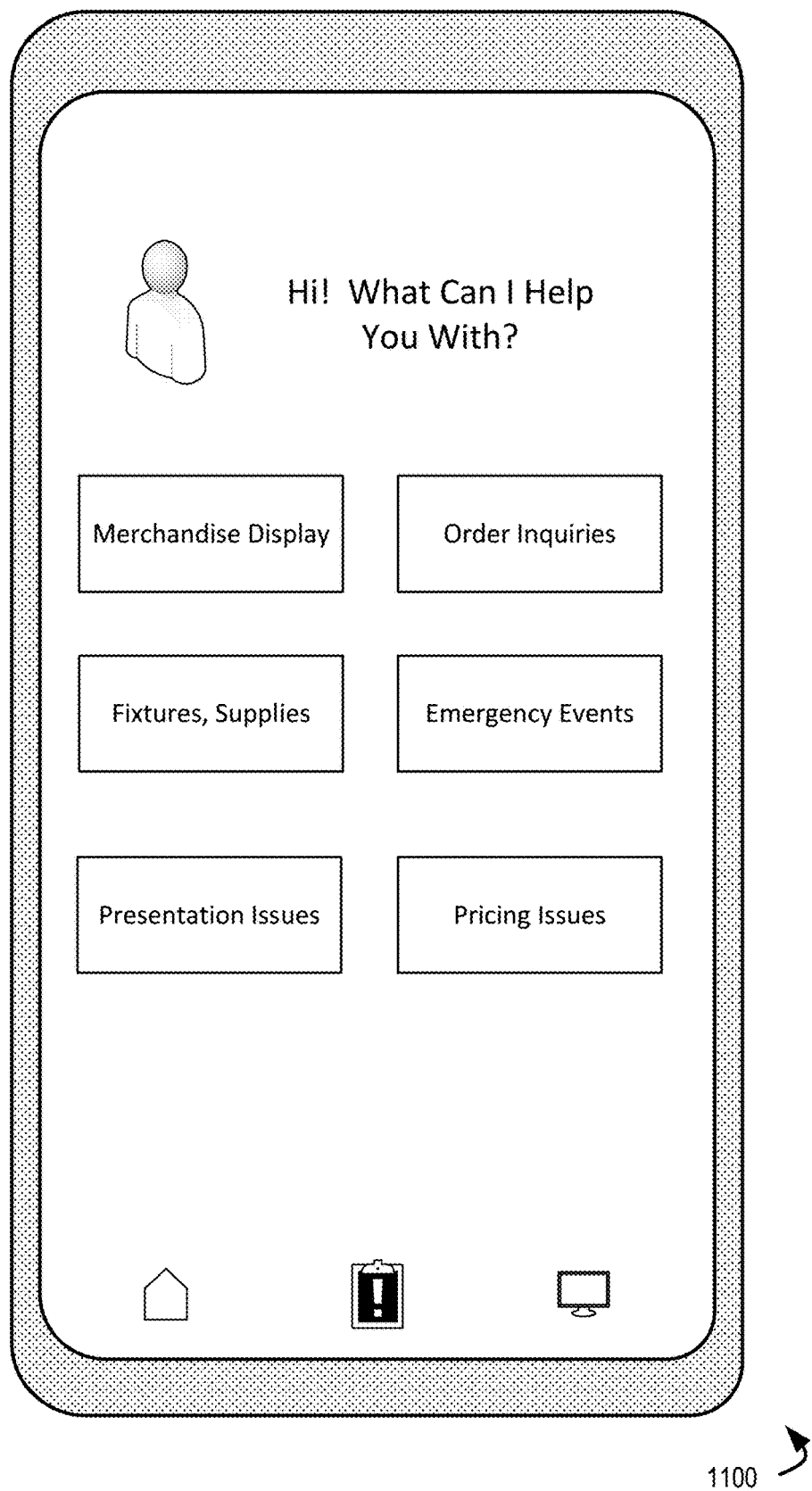
FIG. 11 is an example chat interface useable by a human user for interaction with an automated chat conversation platform according to an example embodiment.

FIG. 11 illustrates a user interface 1100 usable by a retail employee who may be located at a retail location and may need to support for particular issues that may arise out at retail location. The user interface 1100 may be integrated within an application available to the retail employee. In the example shown, the user interface 1100 allows the retail employee to select from among a number of options, such as merchandise display issues, order inquiries, issues with fixtures and/or supplies, emergency events, presentation issues with respect to merchandise, and pricing issues. Other types of issues they arise as well, and options may be presented to the retail employee user within interface 1100.

Figure 12:
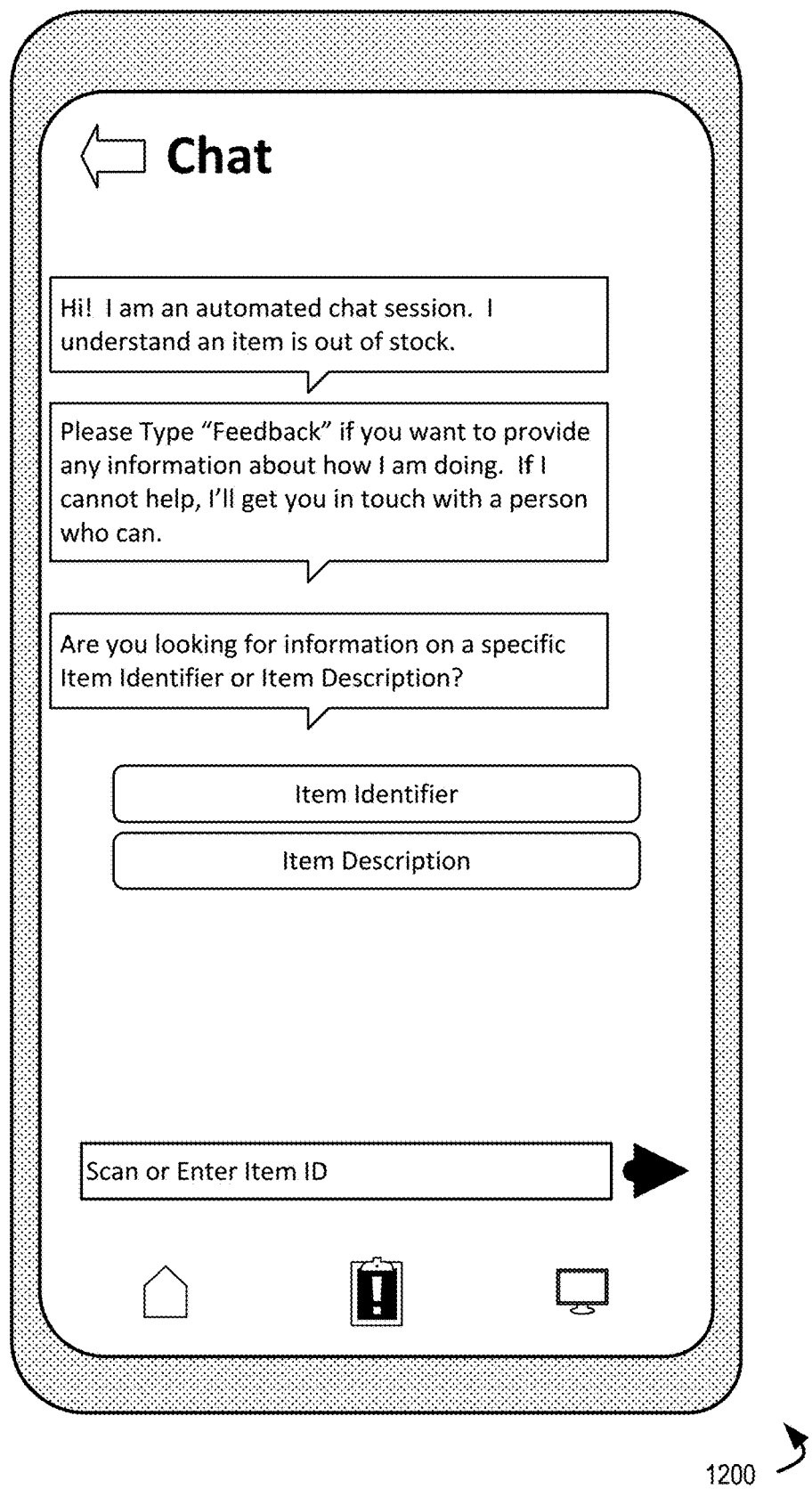
FIG. 12 is a further example chat interface useable by a human user for interaction with an automated chat conversation platform according to an example embodiment.

FIG. 12 illustrates a further user interface 1200 in which a chat session has been initiated. In the example shown, the chat session relates to an item inventory inquiry, e.g., as may be selected from among options presented on user interface 1100 of FIG. 11. In the example shown, the chat session is initiated and an inquiry is presented to the retail employee, requesting information about the manner in which the employee would like to query regarding item inventory. In particular, the retail employee is presented with automated options, seen as the item identifier button and item description button.

Figure 13:
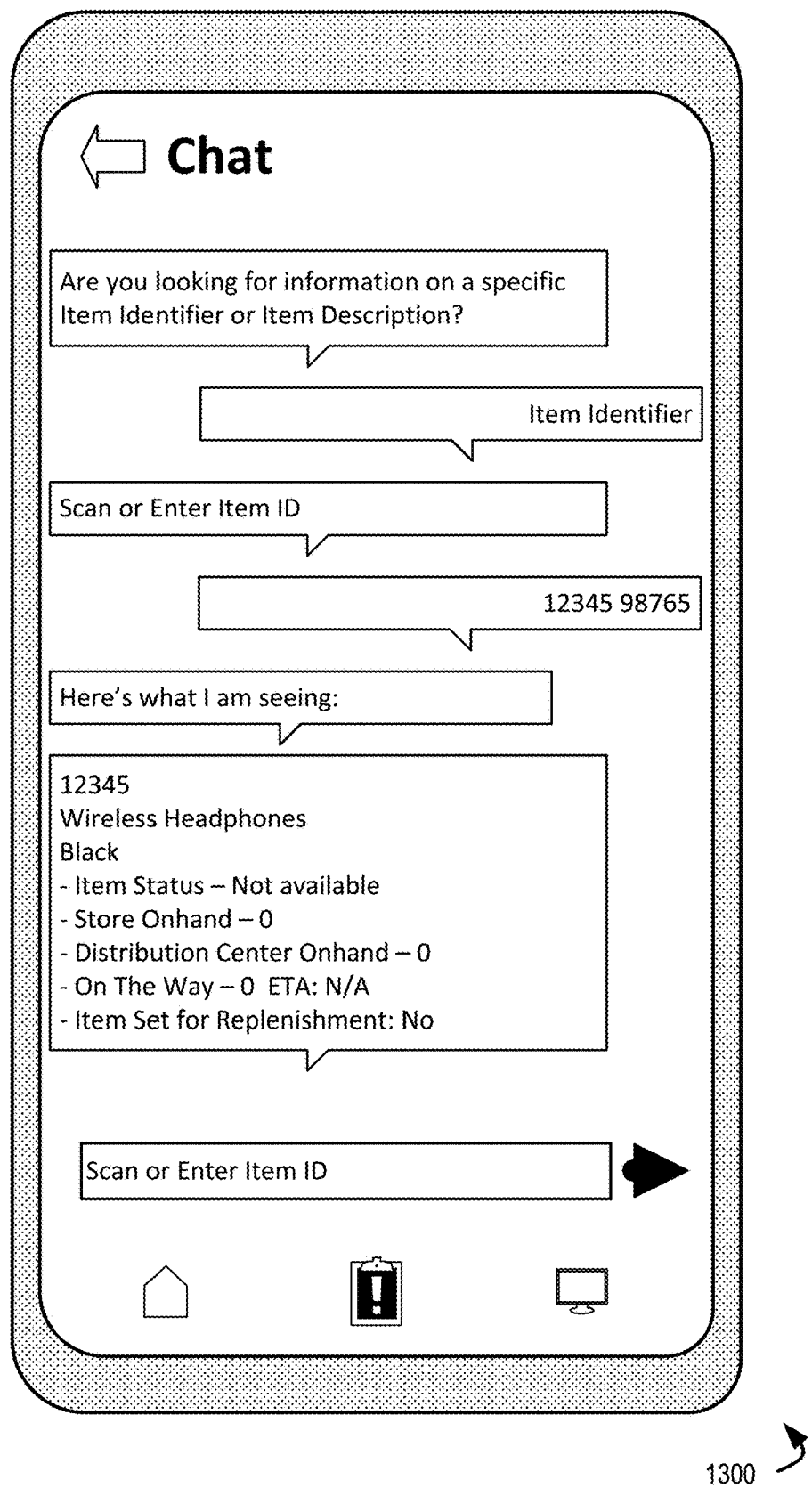
FIG. 13 is a further example chat interface useable by a human user for interaction with an automated chat conversation platform according to an example embodiment.

FIG. 13 illustrates a further user interface 1300 continuing the chat session seen in FIG. 12. In particular, the retail employee has selected the "Item Identifier" option within the user interface 1200 of FIG. 12. In this example as shown, the retail employee has selected the item identifier option of the pre populated, automated options seen in the user interface 1200 of FIG. 12. In this example, the user may either scan or manually enter one or more item identifiers which results in the automated chat conversation platform and communicatively connecting to an item in an inventory database of a retailer. In response to the item identifier, the automated check platform presents item status for the retail employee based on the context of that retail employee. Specifically, item information is presented to the employee base to specifically on the retail location associated with that employee, as well as information associated with the retail organization generally including overall in stock, distribution center, and ordered status of a particular item.

Figure 14:
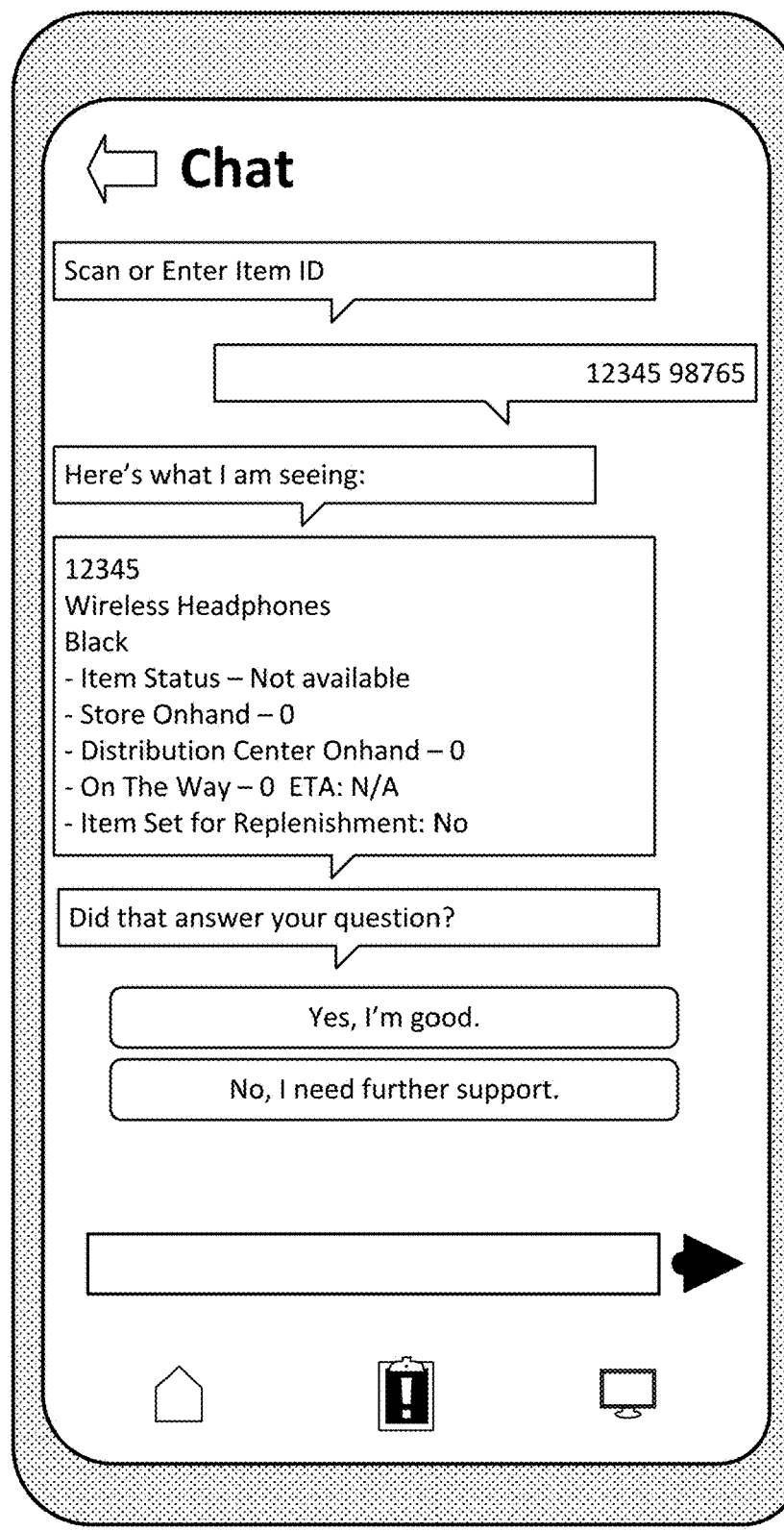
FIG. 14 is a further example chat interface useable by a human user for interaction with an automated chat conversation platform according to an example embodiment.
Figure 15:
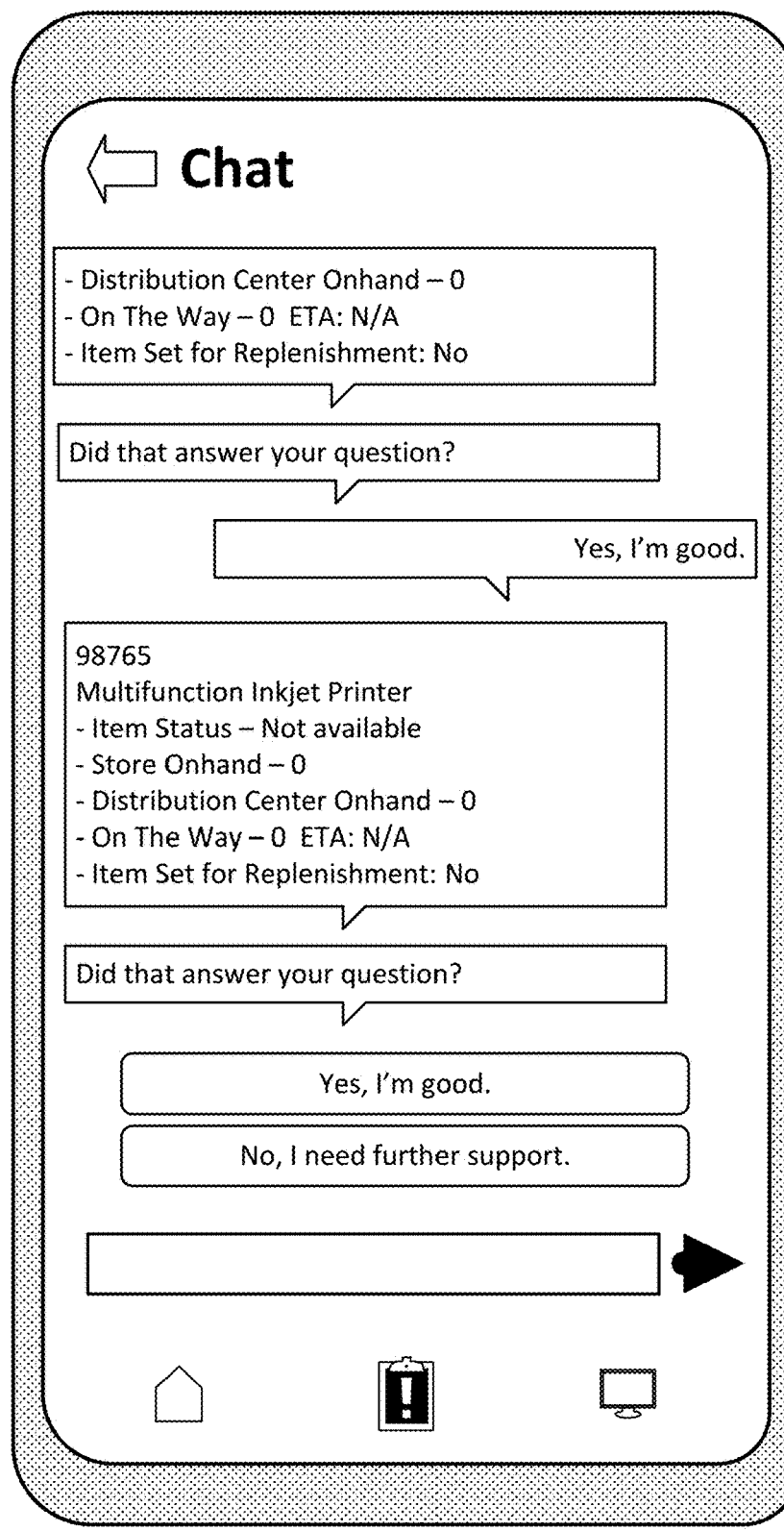
FIG. 15 is a further example chat interface useable by a human user for interaction with an automated chat conversation platform according to an example embodiment.

FIG. 14 illustrates a further user interface 1400 that may be displayed subsequent to the user interface 1300 of FIG. 13. In this example, after display of the item information, the automated chat conversation platform can solicit feedback from the retail employee, i.e., whether the information provided answer the question of the retail employee. Again, automated, pre-populated response options may be presented. In FIG. 15, user interface 1500 shows that the user can select have an option indicating that the question was answered successfully.

Referring back to FIG. 13, the user interface 1300 displays that the retail employee has entered two different item identifiers that in a particular chat message. Following the successful answering of a first inquiry regarding a first item (as seen in FIG. 14), the user interface 1500 displays item information, in particular item inventory information, associated with a second item identified by the second item identifier entered by the retail employee. Similarly, automated, pre-populated response options are presented.

Figure 16:
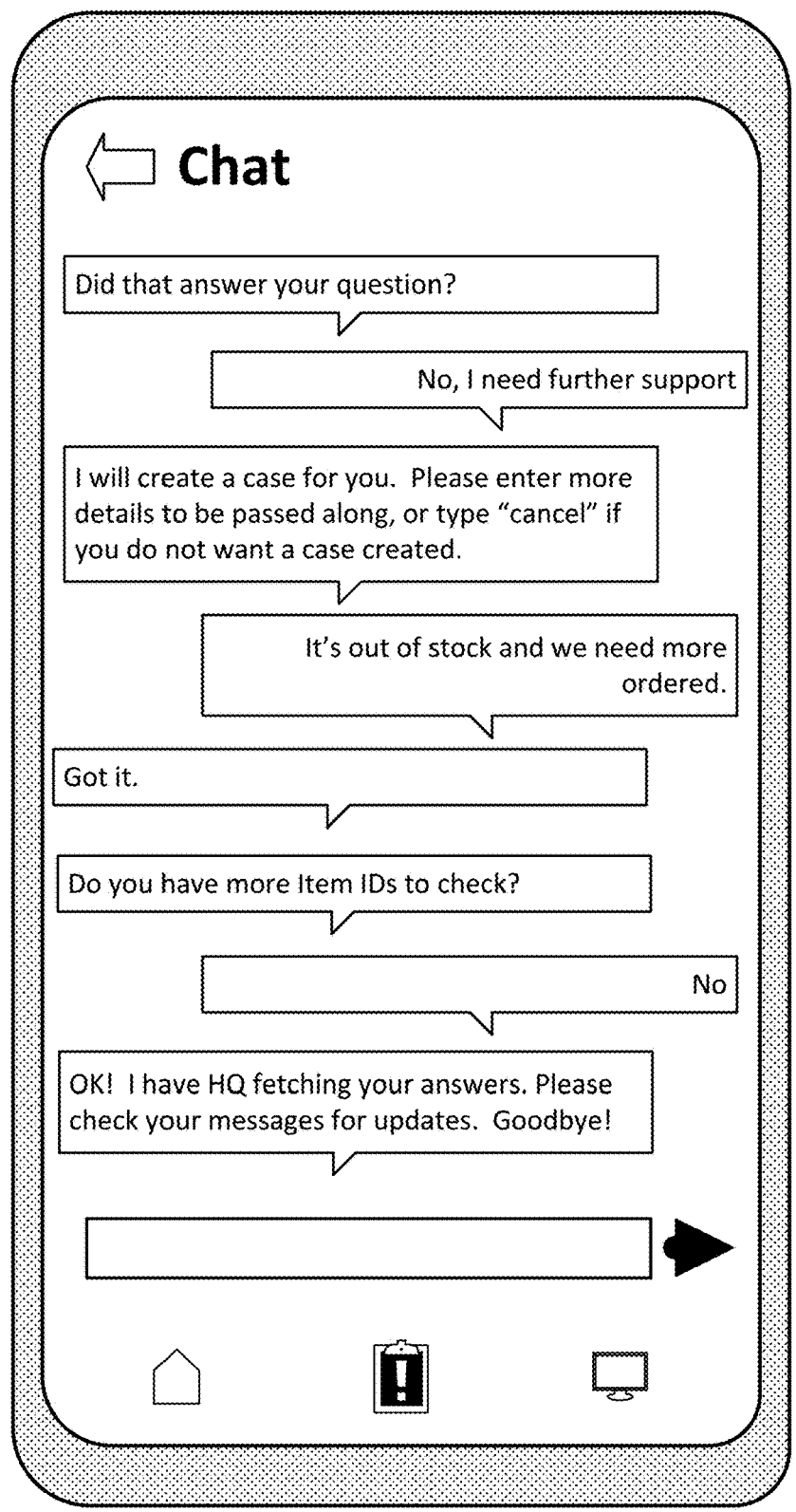
FIG. 16 is a further example chat interface useable by a human user for interaction with an automated chat conversation platform according to an example embodiment.

FIG. 16 illustrates an example user interface 1600 depicting handling of a response by the automated chat conversation platform in which the retail employee is dissatisfied with the response provided by the automation platform. In this example, once the retail employee indicates that further support is required, the automated chat conversation platform may automatically generate a notification to an agent or administrative user, who may manually respond to the issue raised by the retail employee. In this example, the retail employee is given an opportunity to provide additional detail regarding the issues encountered (indicating that further inventory is desired). That additional information, as well as the information from the chat session can, as a whole, be presented to the agent for administrative user for follow up.

Referring to FIGS. 8-16 generally, it is noted that depending on the specific user who engages with the automated chat conversation platform, the types of information, and manner in which chat inquiries are responded to, may differ. This may be, for example, based on physical terminology used by different users or when using different communication channels, or may be based on the rights to the information associated with respective users. For example, customer users visiting a retail website may not be presented with detailed item inventory information about item positioning within a retail supply chain, but may simply be presented with information regarding whether a particular store has a particular item in stock, or an estimated shipping time. Additionally, an employee may be presented with more information when accessing the automated chat conversation platform via a particular application or device used to handle service inquiries at a retail location, rather than a general purpose device or via a website (e.g., via a different communication channel). Still further differences may exist, and may be automatically addressed by the automated chat conversation platform. Accordingly, a chat server implementing the automated chat conversation platform for a plurality of chat sessions may manage chat sessions for different users and via different communication channels. Chat responses provided from the chat server will, accordingly, differ based on a context of each of the plurality of chat sessions.

Figure 17:
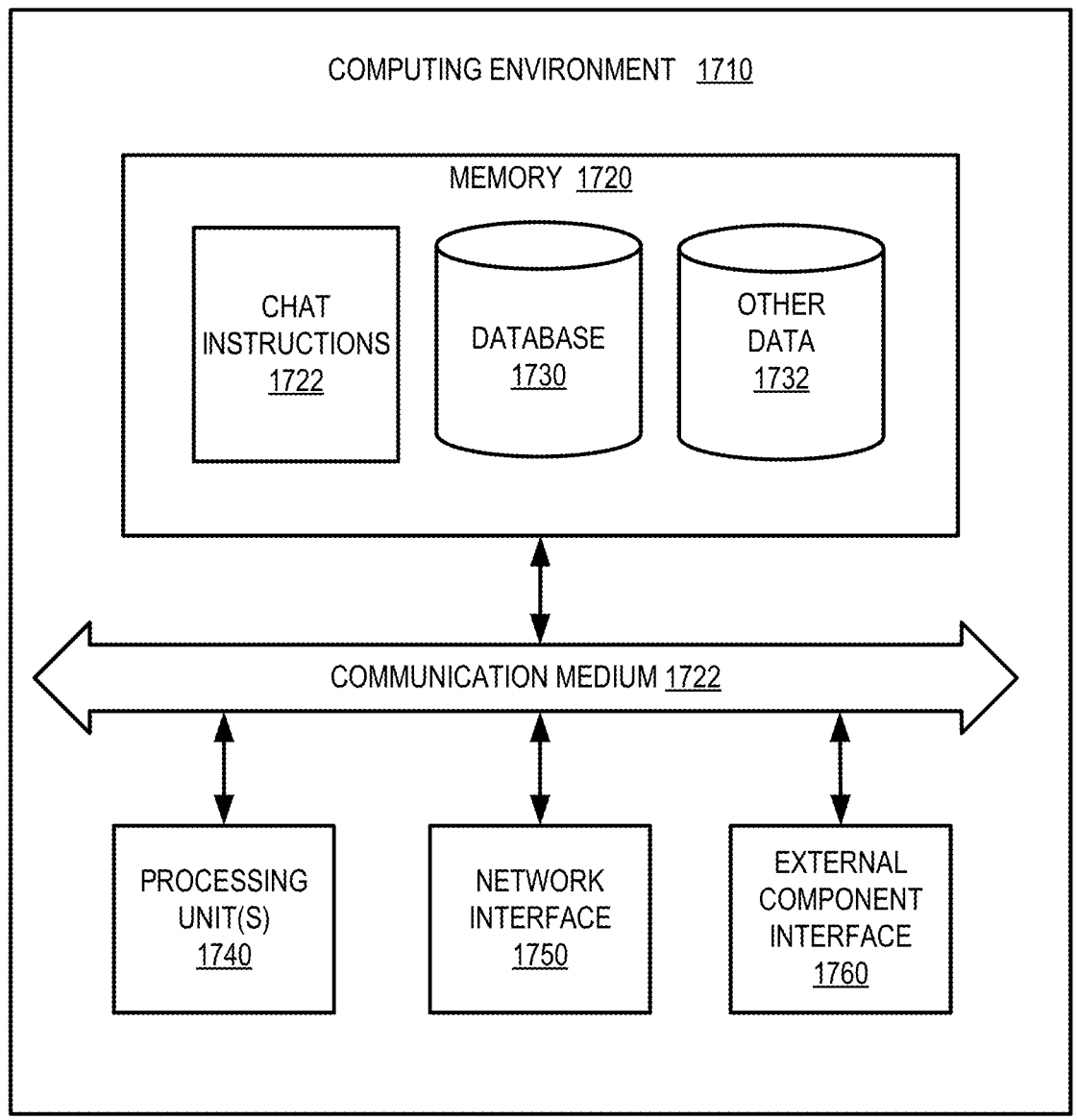
FIG. 17 illustrates an example system with which disclosed systems and methods can be used.

FIG. 17 illustrates an example system 1700 with which disclosed systems and methods can be used. In an example, the user device 12, computing environment 30, and chat interface service 20 can be implemented as one or more systems 1700 or one or more systems having one or more components of systems 1700. In an example, the system 1700 can include a computing environment 1710. The computing environment 1710 can be a physical computing environment, a virtualized computing environment, or a combination thereof. The computing environment 1710 can include memory 1720, a communication medium 1738, one or more processing units 1740, a network interface 1750, and an external component interface 1760.

The memory 1720 can include a computer readable storage medium. The computer storage medium can be a device or article of manufacture that stores data and/or computer-executable instructions. The memory 1720 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1720 can store various types of data and software. For example, as illustrated, the memory 1720 includes chat instructions 1722 for implementing one or more aspects of the chat platform described herein, database 1730, as well as other data 1732. In some examples (e.g., where the computing environment 1710 is a user device 12), the memory 1720 can include instructions for accessing chat platform.

The communication medium 1738 can facilitate communication among the components of the computing environment 1710. In an example, the communication medium 1738 can facilitate communication among the memory 1720, the one or more processing units 1740, the network interface 1750, and the external component interface 1760. The communications medium 1738 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1740 can include physical or virtual units that selectively execute software instructions. In an example, the one or more processing units 1740 can be physical products comprising one or more integrated circuits. The one or more processing units 1740 can be implemented as one or more processing cores. In another example, one or more processing units 1740 are implemented as one or more separate microprocessors. In yet another example embodiment, the one or more processing units 1740 can include an application-specific integrated circuit (ASIC) that provides specific functionality. In yet another example, the one or more processing units 1740 provide specific functionality by using an ASIC and by executing computer-executable instructions.

The network interface 1750 enables the computing environment 1710 to send and receive data from a communication network (e.g., network 14). The network interface 1750 can be implemented as an Ethernet interface, a token-ring network interface, a fiber optic network interface, a wireless network interface (e.g., WI-FI), or another type of network interface.

The external component interface 1760 enables the computing environment 1710 to communicate with external devices. For example, the external component interface 1760 can be a USB interface, Thunderbolt interface, a Lightning interface, a serial port interface, a parallel port interface, a PS/2 interface, and/or another type of interface that enables the computing environment 1710 to communicate with external devices. In various embodiments, the external component interface 1760 enables the computing environment 1710 to communicate with various external components, such as external storage devices, input devices, speakers, modems, media player docks, other computing devices, scanners, digital cameras, and fingerprint readers.

Although illustrated as being components of a single computing environment 1710, the components of the computing environment 1710 can be spread across multiple computing environments 1710. For example, one or more of instructions or data stored on the memory 1720 may be stored partially or entirely in a separate computing environment 1700 that is accessed over a network.

Depending on the size and scale of the computing environment 1710, it may be advantageous to include one or more load balancers to balance traffic across multiple physical or virtual machine nodes. In an example, the node balancer may be a node balancer product provided by F5 NETWORKS, INC. of Seattle, Wash.

Aspects of the platform 1700 and the computing environment 1710 can be protected using a robust security model. In an example, users may be made to sign into the system using a directory service, such as ACTIVE DIRECTORY by MICROSOFT CORPORATION of Redmond, Wash. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full platform 1700, such that portal can run and schedule jobs and serve the portal user interface as long as a single node remains functional. The environment 1710 may include monitoring technology to determine when a node is not functioning so an appropriate action can be taken.

Referring to FIGS. 1-11, it is noted that the extensible, automated conversation management system described herein has a number of technical features that make it particularly advantageous over existing systems for use within an organization. For example, use of extensible interfaces in conjunction with the chat systems described herein allows for integration of a single, trained, automated chat system to be used across a number of channels, as well as to be extended to various other channels. This allows the same chat management system to be used for various applications within an organization. For example, the chat system can be used among retail store employees to quickly answer questions such as store timing, location, and item, price, and inventory details. Additionally, human resources questions, such as policies, can be included in responses. For both employees and customers, return policy questions and item support questions may be provided, whereas for employees, additional details regarding item support or product details may be provided. Additionally, for customers, account balances or other types of transaction details could be supported as well. Furthermore, different chatbot personalities can be dynamically applied, for example based on the interface within which a chat is instantiated, the particular user type instantiating the chat session, and other contextual information that may be used to determine the manner in which a chatbot may be most responsive.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. An automated chat conversation platform comprising:
a chat gateway communicatively connected to a plurality of chat channel interfaces, each of the chat channel interfaces being configured to exchange messages with chat users via a different chat platform type;
a chat server communicatively connected with the chat gateway, the chat server programmed to manage a plurality of chat sessions each including one or more natural language messages, the plurality of chat sessions being initiated from one or more of the plurality of chat channel interfaces via the gateway;
a collection of chatbots each configured to receive the natural language messages associated with a chat session from the chat server, wherein a number of chatbots included in the collection of chatbots available to receive natural language messages is scalable in real time responsive to a volume of active chat sessions at the chat server, and wherein each chatbot exchanges natural language messages in a chat session based on information from one or more support services located external to the collection of chatbots.

2. The automated chat conversation platform of claim 1, further comprising an administrative user interface provided by the automated chat conversation platform, the administrative user interface configured to display to an administrative user one or more of: number of chat sessions currently open, average time per chat session, total chat sessions resolved, chat sessions resolved entirely by automated chatbot, and chat timeouts.

3. The automated chat conversation platform of claim 1, wherein the natural language messages comprise at least one of voice messages and text messages.

4. The automated chat conversation platform of claim 1, wherein the plurality of chat channel interfaces are implemented on a chat interface server, at least one of the chat channel interfaces providing an interface-specific proxy to the corresponding chat interface.

5. The automated chat conversation platform of claim 1, wherein the one or more support services includes natural language processing engine, a conversation management module, and a business context engine.

6. The automated chat conversation platform of claim 1, further comprising a core engine communicatively coupled to the chat server, the core engine including a cognitive engine and a conversation management engine.

7. The automated chat conversation platform of claim 1, further comprising one or more integrations, the one or more integrations providing content useable in chat responses by the chatbots.

8. The automated chat conversation platform of claim 1, wherein the one or more integrations includes a product catalog integration.

9. The automated chat conversation platform of claim 1, further comprising a user agent interface including a plurality of selectable chat sessions.

10. The automated chat conversation platform of claim 9, wherein the plurality of selectable chat sessions comprise chat sessions occurring using different chatbots.

11. The automated chat conversation platform of claim 9, further comprising a user agent chat interface generated in response to selection of one of the plurality of selectable chat sessions, the user agent chat interface allowing a user agent to interrupt responses generated by the chatbot and provide one or more responses in the chat session.

12. The automated chat conversation platform of claim 11, wherein the user agent chat interface includes a return option selectable to return control of generating responses in the chat session to the chatbot.

13. The automated chat conversation platform of claim 1, wherein the plurality of chat sessions are associated with users across a plurality of heterogeneous audience types and communication channels, and wherein chat responses provided from the chat server differ based on a context of each of the plurality of chat sessions.

* * * * *